United States Patent

Couillard

[11] Patent Number: 6,113,059
[45] Date of Patent: Sep. 5, 2000

[54] DEAD SHAFT IDLER

[75] Inventor: Cal Couillard, Deerfield, Wis.

[73] Assignee: Engineered Metals Corporation, Deerfield, Wis.

[21] Appl. No.: 08/948,448

[22] Filed: Oct. 10, 1997

[51] Int. Cl.⁷ .......................... B65G 15/08; B65G 15/60; B65G 13/00
[52] U.S. Cl. .......................... 248/694; 198/837; 198/824; 193/37
[58] Field of Search .......................... 248/580; 198/825, 198/829, 842, 843; 193/37; 29/129.5, 130, 132; 271/272; 172/519, 537, 747; 100/155 R, 172, 176; 492/36, 59

[56] References Cited

U.S. PATENT DOCUMENTS

| | | |
|---|---|---|
| 1,622,758 | 3/1927 | Buelke et al. . |
| 1,742,454 | 1/1930 | Van Derhoef . |
| 1,990,805 | 2/1935 | Watson et al. . |
| 2,572,276 | 10/1951 | Moe ..................................... 193/37 X |
| 2,593,069 | 4/1952 | Steinmetz . |
| 2,808,730 | 10/1957 | Shank . |
| 3,889,715 | 6/1975 | Lilja et al. .............................. 138/117 |
| 3,958,837 | 5/1976 | Chagawa . |
| 4,029,200 | 6/1977 | Dillon . |
| 4,055,919 | 11/1977 | Belanger ................................... 51/334 |
| 4,316,586 | 2/1982 | Mocco . |
| 4,425,694 | 1/1984 | Somerville .............................. 271/272 |
| 4,440,295 | 4/1984 | Blackwood-Murray et al. . |
| 4,523,674 | 6/1985 | Haugen et al. .......................... 198/843 |
| 4,637,334 | 1/1987 | Montandon .............................. 114/106 |
| 4,673,380 | 6/1987 | Wagner . |
| 4,715,571 | 12/1987 | Soltow et al. .......................... 248/74.2 |
| 4,729,078 | 3/1988 | Skegin .................................... 362/294 |
| 4,737,046 | 4/1988 | Inabata ................................... 400/661 |
| 4,780,746 | 10/1988 | Naramore et al. . |
| 4,805,365 | 2/1989 | Bastian ..................................... 52/282 |
| 4,823,689 | 4/1989 | Kishino et al. ..................... 100/155 R |
| 4,830,179 | 5/1989 | Fyfe . |
| 5,022,132 | 6/1991 | Valster et al. . |
| 5,030,937 | 7/1991 | Loubier et al. .......................... 335/303 |
| 5,101,607 | 4/1992 | Staeger ..................................... 52/646 |
| 5,219,021 | 6/1993 | Edelstein et al. ................... 165/104.26 |
| 5,387,962 | 2/1995 | Castelli et al. . |
| 5,568,976 | 10/1996 | Gabriele . |
| 5,600,426 | 2/1997 | Gramlich et al. . |
| 5,634,657 | 6/1997 | Rose et al. ........................... 280/728.2 |
| 5,643,391 | 7/1997 | Couillard et al. . |
| 5,645,166 | 7/1997 | Su ........................................ 206/315.6 |
| 5,746,387 | 5/1998 | Pretto et al. .......................... 242/571.2 |

*Primary Examiner*—Anita M. King
*Assistant Examiner*—Michael Nornberg
*Attorney, Agent, or Firm*—Michael Best & Friedrich LLP

[57] ABSTRACT

The invention provides a tubing material suitable for constructing a double-walled dead shaft idler. The idler so constructed is lighter weight than standard idlers. It permits bearings to be mounted at a distance recessed from the ends of the idler, thereby reducing deflection or bending of the idler. The tubing also includes built-in balancing lugs.

22 Claims, 7 Drawing Sheets

DEAD SHAFT IDLER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to idlers used in various kinds of machinery and in particular, to an improved dead shaft idler.

For more than 100 years, dead shaft idlers have been manufactured with the same methods and materials. The two most common materials used are steel and aluminum. Methods for manufacturing are substantially the same for both. To fabricate a dead shaft idler, tubing is selected based on the needed outside diameter and the inside diameter (e.g., depending on speed and width). The tubing is cut to length, end plugs are installed, the outside diameter is machined to true it, and bearing bores are machined into the end plugs. The tube is then balanced as a last step. The balancing step is critical and is a labor intensive effort. Balancing requires the placement of weights, which often end up rolling loose in the center of the idler.

Because all kinds of conveying and converting systems utilize idlers, considerable attention has been given to improving their reliability, reducing bending of the tubing and reducing the inertial tension required to turn the idler. In web (i.e., continuous sheet) machinery, all kinds of materials, e.g., paper, plastic, tissue, foam, may be looped around a series of idler rollers. The idler rollers must have a necessary rigidity and strength to support a web load while withstanding the turning torque stress produced by the web. As noted previously, idler rollers have been made of steel, aluminum or other metals to provide the necessary rigidity and strength. Yet, the materials themselves have inherent problems. For example, steel rollers require excessive horsepower to overcome the initial start-up inertia and to keeping the steel rollers turning.

In many machines and systems, many different idlers of different lengths and diameters are needed. This requires extensive fabrication, costing substantial sums for labor and parts, as well as requiring a large inventory of tubing and bearing assemblies.

Many patents disclose idlers and methods of making thereof. For example, U.S. Pat. No. 1,742,454 issued to Van Derhoef and U.S. Pat. No. 2,593,069 issued to Steinmetz teach methods of making idler rollers. U.S. Pat. No. 1,622,758 issued to Beulke et al.; U.S. Pat. No. 2,808,730 issued to Shank; and U.S. Pat. No. 3,958,837 issued to Chagawa disclose improved roller designs. U.S. Pat. No. 4,029,200 issued to Dillon teaches a roller design fabricated in plastic. U.S. Pat. No. 5,022,132 issued to Valster et al. and U.S. Pat. No. 5,568,976 issued to Gabriele disclose bearing mounts for idlers. U.S. Pat. No. 5,387,962 issued to Castelli et al. discloses a self-aligning roll for belt loop modules.

Notwithstanding these known idlers and bearing mounts, the art has not adequately responded to date with the introduction of an idler which reduces job specific construction by eliminating end plugs, balancing weights, and extensive machining.

BRIEF SUMMARY OF THE INVENTION

The present invention provides a double-walled tubing having inside diameters of standard industry size. A dead shaft idler constructed with the tubing in accordance with the present invention results in an idler that is about 20% less in weight compared to a conventional metal roller, such as a ½ inch thick wall standard aluminum idler. The tubing permits recessing of the bearing bore which allows for better deflection (i.e., bending) properties. Further, the moment of inertia of a finished idler in accordance with the present invention is reduced by about 30–40% depending on diameter. The combination of less weight and reduced moment of inertia results in a reduced inertial tension of nearly 40% compared to conventional metal idlers. In other words, a standard single-walled idler is 40% harder to rotate as an idler in accordance with the present invention. Further, the cost of producing an idler in accordance with the present invention is about 50% that of a conventional idler.

The foregoing, and other advantages of the present invention, are realized in one aspect thereof in a tubing material suitable for an idler, which includes an outer elongate tube; an inner elongate tube concentrically disposed within the outer tube; a plurality of radially disposed spokes rigidly interconnecting the inner tube to the outer tube; and a plurality of spaced-apart balancing lugs radially disposed about the tubing material between the outer and inner tubes, for holding balancing pins. The lugs accommodate in mating fashion one or more balancing pins, and thus, eliminate the problem of weights rolling around loose inside the idler.

In another aspect, the invention provides an idler which includes a substantially cylindrical idler body having opposed ends. The idler body includes an outer elongate tube; an inner elongate tube concentrically disposed within the outer tube; a plurality of radially disposed spokes rigidly interconnecting the inner tube to the outer tube; and spaced-apart balancing lugs radially disposed about the idler body between the outer tube and the inner tube, for holding balancing pins. The idler also includes a pair of bearings, spaced apart and press fit into the inner surface of the inner tube, at a distance apart from the ends of the idler body.

In a further aspect, the invention provides a method of constructing an idler. The method includes the steps of (i) providing a length of a tubing having opposed ends, and including an outer elongate tube; an inner elongate tube having an inner surface, and concentrically disposed within the outer tube; a plurality of spokes rigidly interconnecting the inner tube to the outer tube; and spaced-apart balancing lugs for holding balancing pins, radially disposed about the tubing between the outer tube and the inner tube; (ii) inserting a bearing assembly into the inner surface of the inner tube at a distance apart from an end of the tubing material, the inner surface closely receiving the bearing assembly; and (iii) press-fitting a support shaft into the bearing assembly.

In still another aspect, the invention provides a kit for constructing an idler. The kit includes (i) a tubing having opposed ends, and including an outer elongate tube; an inner tube having an inner surface, and concentrically disposed within the outer tube; a plurality of spokes rigidly interconnecting the inner tube to the outer tube; and balancing lugs which are spaced apart and radially disposed about the tubing between the outer tube and inner tube, for holding balancing rods; (ii) a bearing assembly dimensioned for press fitting into the inner surface of the inner tube at a distance apart from an end of the tubing material; and (iii) balancing pins dimensioned and configured to be held by the lugs.

In a still further aspect, the invention provides a method of reducing tube deflection in an idler for supporting a web.

The method includes (i) providing a tubing having opposite ends, and including an outer elongate tube; an inner tube having an inner surface concentrically disposed within the outer tube; a plurality of spokes rigidly interconnecting the inner tube to the outer tube; and balancing lugs which are spaced apart and radially disposed about the tubing between the outer tube and the inner tube, for holding balancing rods; and (ii) press fitting a pair of bearings, each into opposite ends of the tubing into the inner surface of the inner tube at a distance apart from the end of the tubing and at a distance from each other to provide an idler width W; wherein the tubing supports a web load L and the deflection of the tubing is reduced in proportion to the cube of the idler width W.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWING(S)

The preferred exemplary embodiment of the present invention will hereinafter be described in conjunction with the appended drawing wherein like designations refer to like elements throughout and in which.

DETAILED DESCRIPTION OF THE INVENTION

The present invention relates to idlers used in all kinds of machinery, e.g., web conveying or converting machines, and more particularly, to a double-walled tubing material which allows a simplified method of construction of idlers as well as idlers with advantageous deflection properties. The double-walled construction permits thinner walls for the tubes compared to single-walled conventional tubing. The double-walled tubing also permits recessed bearing bores, and has a built-in balancing feature. These attributes are achieved through a novel combination of physical and structural features.

Figure 1:
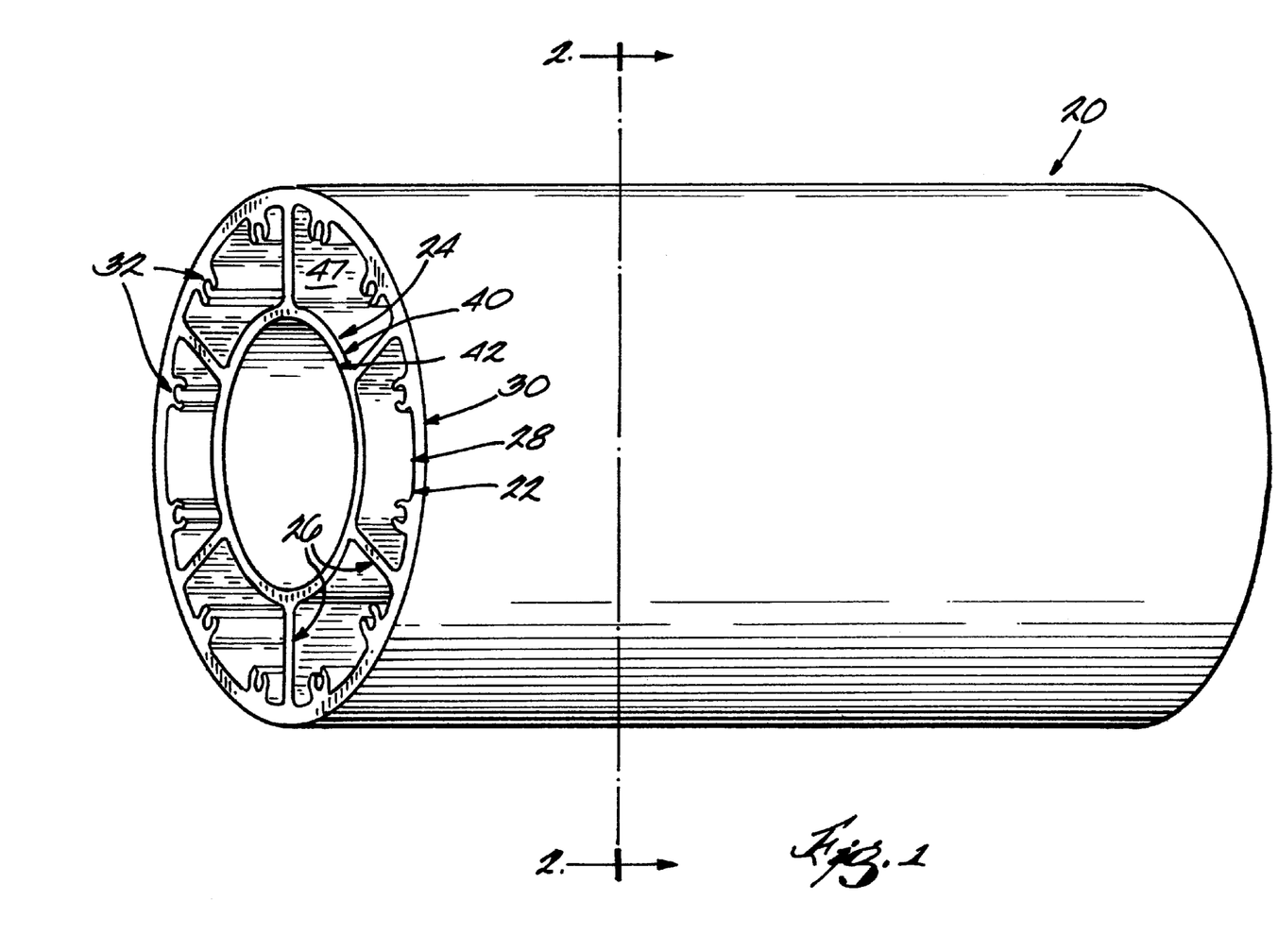
FIG. 1 is an isometric view of an idler tubing in accordance with the present invention.
Figure 2:
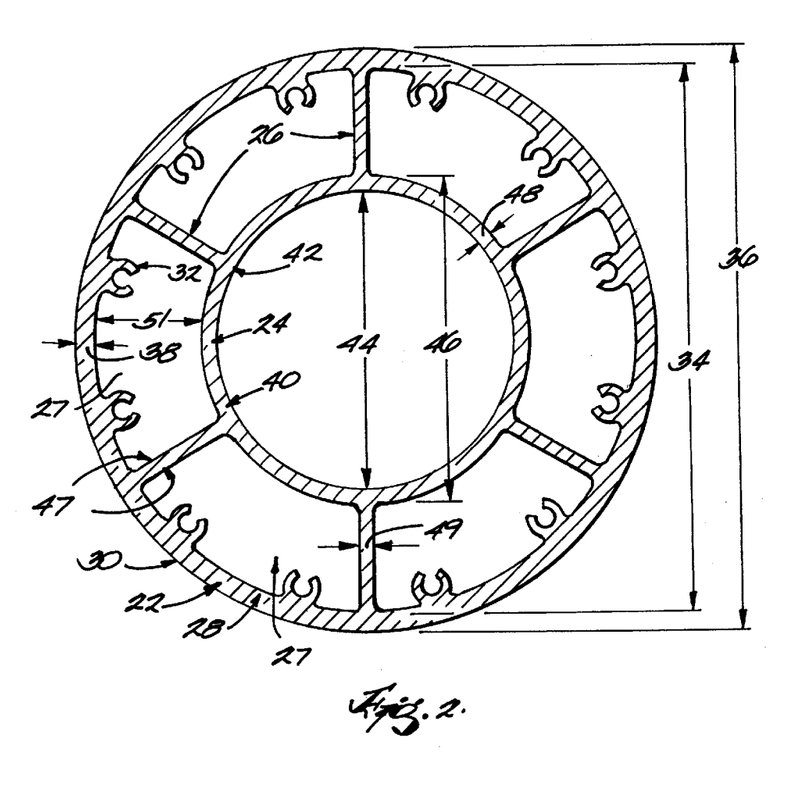
FIG. 2 is a cross-sectional view of the idler tubing of FIG. 1 along line 2—2'.

Reference is initially made to FIGS. 1 and 2 depicting an idler tubing in accordance with the present invention, and generally designated as reference numeral 20. Tubing 20 is substantially cylindrical, and has an outer elongate, substantially hollow cylindrical wall, shell or tube 22 and an inner elongate, substantially hollow cylindrical wall of shell 24 concentrically disposed within the outer wall 22. The central longitudinal axes of tubes 22 and 24 are substantially coincident with each other. Outer shell 22 and inner shell 24 are rigidly interconnected by a plurality of elongate interconnectors, bars or spokes 26 which run the length of tubing 20. The number of spokes 26 can be varied, for example, from three to nine. Tubing 20 also includes a number of balancing lugs 32, variations of which are described hereinafter.

Outer shell 22 has an inside circumferential surface 28, an outside circumferential surface 30. Outer shell 22 also has an inside diameter 34, an outside diameter 36 and a wall thickness 38. Thickness 38 is suitably about 0.200 inches.

Inner shell 24 has an outer circumferential surface 40 and an inner circumferential surface 42. Inner shell 24 has an inside diameter 44, an outer diameter 46 and a wall thickness 48. Thickness 48 is suitably about 0.100–0.150 inches depending on diameter 36 of outer wall 22. The thicknesses of both shells 22 and 24 are substantially less than the typical nominal sidewall thickness of conventional single-walled tubing.

Spokes 26 interconnect outer surface 40 of inner tube 24 with inside surface 28 of outside tube 22, spokes 26 being radially disposed and equally spaced on circumferential surface 40 and circumferential surface 28 and extending therebetween. Spokes 26 define a plurality of spaces 27. Spokes 26 have sidewalls 47, a thickness 49 and a length 51. Thickness 49 is suitably about 0.100–0.150 inches depending on diameter 36 of outer wall 22. Length 51 is suitably about 0.5 inch to 1.5 inches depending on diameter 36. Concentric shells 22 and 24 and spokes 26 are suitably constructed of materials such as extruded aluminum, carbon fiber and plastic. The plastic is suitably any hard wearing, impact resistant polymer or copolymer composition, e.g., a polyester, a polypropylene, a nonfoamed polyurethane.

In the illustrated embodiment of FIGS. 1 and 2, inside surface 28 of outer shell 22 includes a plurality of balancing lugs 32 radially disposed about surface 28 and extending the length of tubing 20. Balancing lugs 32 are equally spaced about surface 28. Suitably, there are two balancing lugs positioned between a pair of spokes 26. Balancing lugs 32 accommodate balancing rods as explained hereinafter.

Figure 3:
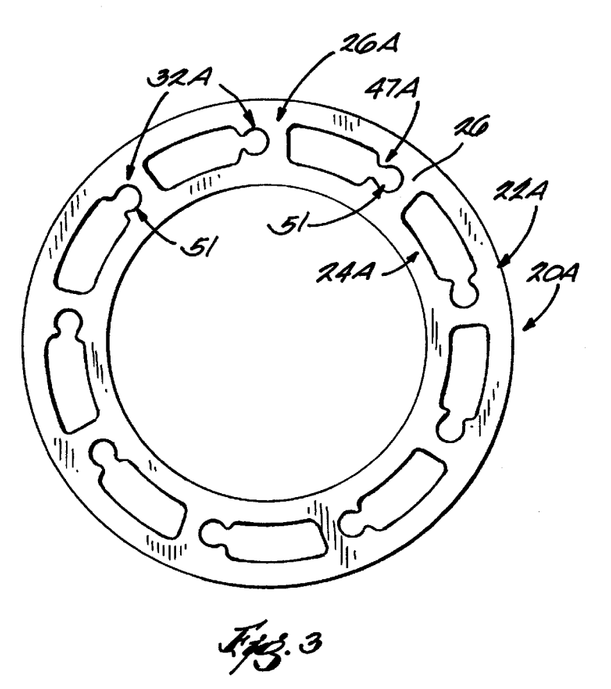
FIG. 3 is a cross-sectional view of an idler in accordance with the present invention, illustrating the placement of bearings assemblies in the recessed bearing bores.

Reference is now made to FIG. 3 wherein a tubing 20A is shown with a second configuration of the balancing lugs. Tubing 20A has an outer tube 22A, an inner tube 24A and spokes 26A. In this configuration, balancing lugs 32A are integral with spokes 26A. Tubing 20A is similar in every other respect to tubing 20 described hereinbefore. Spokes 26A each have side walls 47A. Lugs 32A are shaped as integral arcuate recesses 51 in one of the side walls 47A of each spoke 26A. In effect, the balancing lugs are rotated 90°, and made part of the spoke rather than the outer wall. Tubing 20A has the same advantageous features as tubing 20 described hereinabove except for the alternative configuration of the balancing lugs. Balancing rods are used in the same manner described hereinafter.

Figure 4:
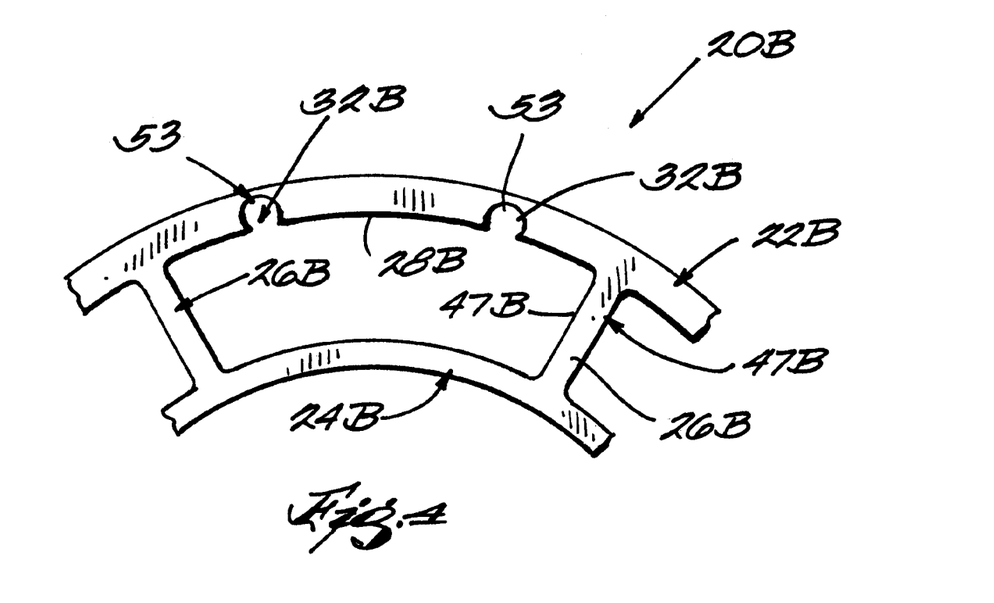
FIG. 4 is a cross-sectional view of along line 3—3" of FIG. 3.

As seen in FIG. 4, a tubing 20B has a third configuration of balancing lugs. Tubing 20B has an outer tube 22B, an inner tube 24B and spokes 26B. Outer tube 22B has an inside surface 28B. In this configuration, balancing lugs 32B are integral with outer tube 22B, and are shaped as integral recesses 53 in inside surface 28B of outer tube 22B. Tubing 20B is similar in every other respect to tubing 20 described hereinbefore, and has the same advantages as tubing 20. Balancing rods are used in the same manner described hereinafter.

Figure 5:
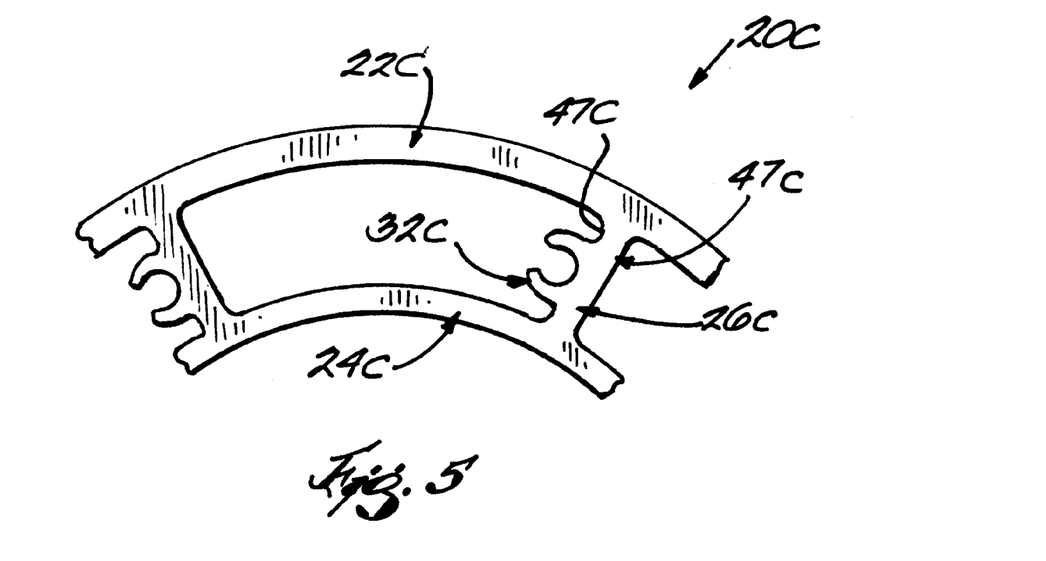
FIG. 5 is an illustration of the use of the balancing lugs of the idler tubing in accordance with the present invention.

As seen in FIG. 5, a tubing 20C has a fourth configuration of balancing lugs. Tubing 20C has an outer tube 22C, an inner tube 24C and spokes 26C. Spokes 26C have sidewalls 47C. In this configuration, balancing lugs 32C are arcuate projections extending from one of sidewall 47C of each spoke 26C. Tubing 20C is similar in every other way to tubing 20 described hereinbefore, and has the same advantages as tubing 20. Balancing rods are used in the same manner described hereinafter.

Figure 6:
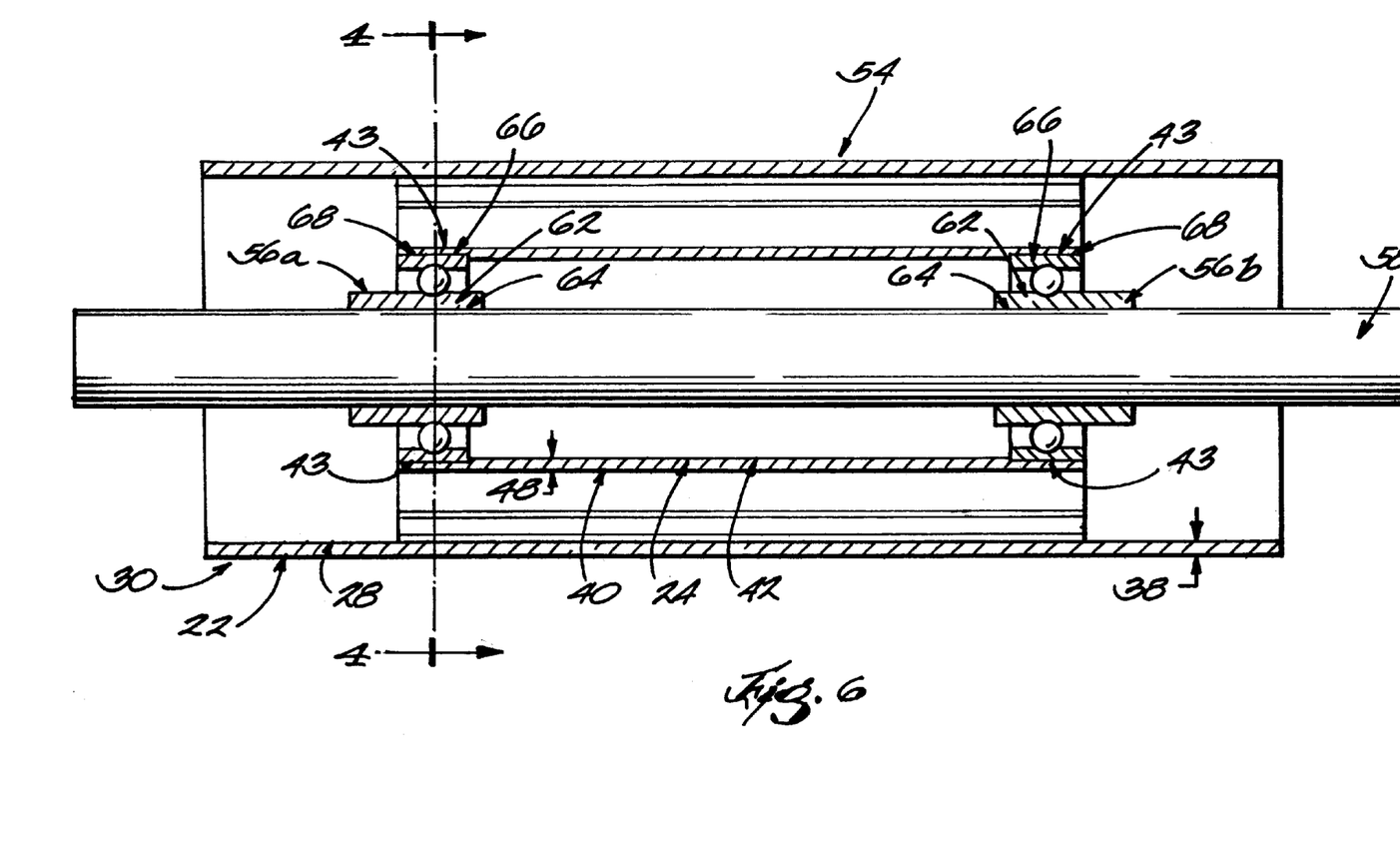
FIG. 6 is a cross-sectional view of an idler tubing showing a second configuration of the balancing lugs in accordance with the present invention.
Figure 7:
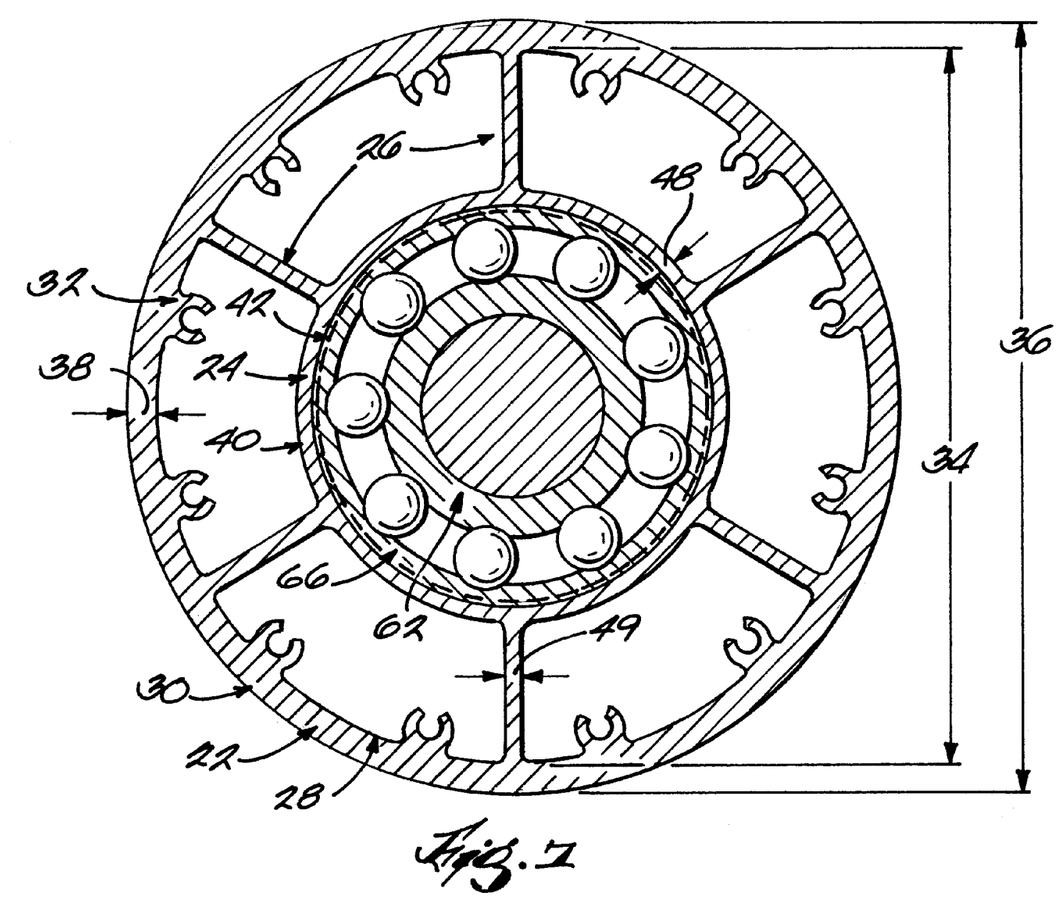
FIG. 7 is a partial cross-sectional view of an idler tubing showing a third configuration of the balancing lugs.

Reference is now made to FIGS. 6 and 7 wherein an idler roller 52 constructed of tubing 20 having outer shell 22, inner shell 24 and spokes 26 as described hereinbefore, is shown. It is understood, in accordance with the present invention, that idler 52 can be constructed with tubing 20A, tubing 20B, tubing 20C, tubing 200 and tubing 300 which is described hereinafter. Idler roller 52 includes an idler body 54, two bearing assemblies 56a and 56b and an axial elongate idler support shaft 58 about which roller 52 rotates. Support shaft 58 has an outer circumferential surface 60. The central longitudinal axes of support shaft 58 and roller 52 are substantially coincident.

Bearing assemblies 56a and 56b each have an inner race 62 with an inner circumferential surface 64 and an outer race 66 with an outer circumferential surface 68. Inner race 62 is press-fit onto support shaft 58 and outer race 62 is press-fit into a machined inner surface 43 of inner surface 42 of inner tube 24, i.e., surface 42 is suitably machined, as needed, to match the bearing assembly outside diameter to form machined surface 43. In this way, idler body 54 rotates in unison with outer race 66 of the bearing. The press or interference fit between outer circumferential surface 68 of outer race 66 and machined inner surface 43 of inner tube 24 prevents idler body 54 from rotating relative to outer race 66. The press or interference fit between inner circumferential surface 64 of inner race 62 and outer circumferential surface 60 of support shaft 58 prevents inner race 62 from rotating relative to support shaft 58. While idler body 54 is suitably made of, e.g., extruded aluminum, carbon fiber or plastic, support shaft 58 may be suitably made of the same or another material, e.g., steel. Bearing 56a and 56b may be any class of insert ball bearings.

As can be seen in FIG. 6, bearings 56a and 56b are recessed from the ends of idler body 54. Tubing 20, from which idler body 54 is constructed, permits bearings to be so mounted and recessed in inner tube 24. As such, no end plugs are necessary, thus, eliminating their installation and their machining for bearing bores. The recessed mounting also shortens the distance between the bearings and therefore, decreases the deflection property in the idler body as explained in detail hereinafter.

Inside diameter 44 of inner tube 24 is matched to industry standards for bearings. Thus, while outer diameter 36 of outer tube or shell 22 can be varied, e.g., 4", 5", 6", inside diameter 44 of inner tube or shell 24 can be maintained to match the industry standards for bearings. As outer diameter 36 increases, length 51 and thickness 48 of spokes 26 are also proportionately increased as the distance between inner tube 24 and outer tube 22 increases. Table 1 shows an exemplary relationship between the outer diameter 36 of outer tube 22, bearing size and inside diameter 44 of inner tube 24.

TABLE 1

| Outer Diameter (36) | Bearing Size | Nominal Inside Diameter (44) |
| --- | --- | --- |
| 6" | 1.5"–2.0" | 3.900" |
| 5" | 1.5"–2.0" | 3.900" |
| 4" | 1.0"–1.5" | 3.100" |
| 3.5" | 1.0"–1.25" | 2.800" |
| 3" | 0.50"–1.0" | 2.000" |

An idler constructed from double-walled tubing material in accordance with the present invention provides an advantageous 20% reduction in weight on average compared to ordinary single-walled tubing because of its thinner walls. Thus, the tubing provides substantial cost savings in tubing materials.

An idler constructed in accordance with the present invention has also improved deflection or bending properties. The deflection, D, of an idler tube is given by the following equation:

$$D = \frac{5LW^3}{384EI}$$

wherein L is the load of the web, W is the width or distance between the bearings on either end of the idler, E is the moment of elasticity of the material of the idler tubing, e.g., extruded aluminum, and I is the moment of inertia of the tubing. The moment of inertia, I, is reduced by an average of 25% by double-walled construction, i.e., by moving tubing material from the outer wall towards the center, and deflection, i.e., bending, of the tube is markedly reduced by moving the bearings inward. It is also seen that deflection or bending is proportional to the third power of the width, i.e., even a small reduction in width can have a large effect on reducing bending. The tubing in accordance with the present invention can effect such reduction in width. For example, by locating the bearings 10 inches from the end of 120-inch idler, the effective load is spread over 100 inches. This 17% change in width leads to a 42% reduction in deflection. By recessing the bearing bores, machining chatter is also reduced drastically and the idler is nearly twice as strong in deflection.

Figure 8:
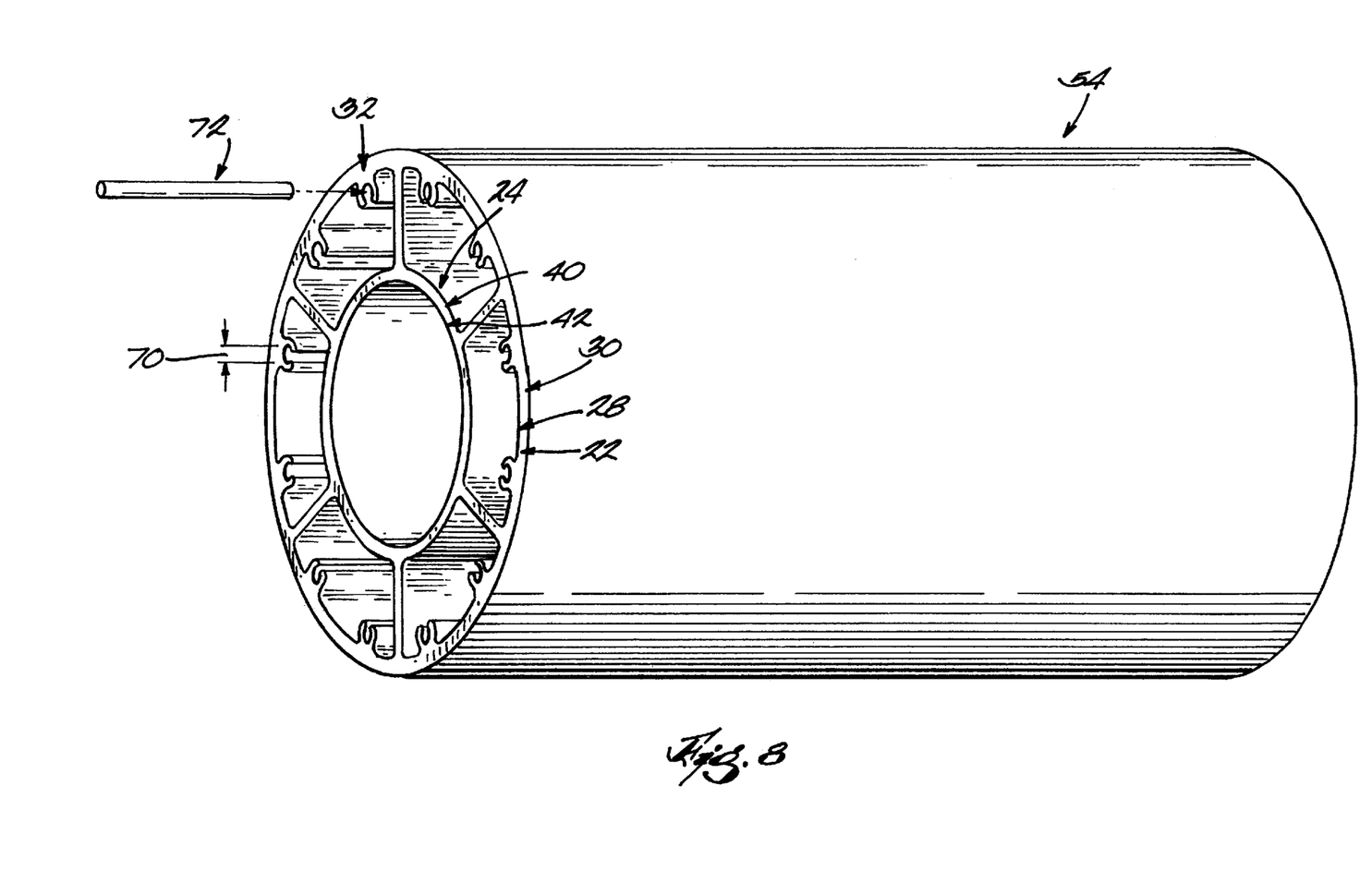
FIG. 8 is a partial cross-sectional view of an idler tubing showing a fourth configuration of the balancing lugs.

Reference is now made to FIG. 8 wherein a built-in balancing feature of tubing 20 (20A, 20B, 20C, 200 and 300, described hereinbelow) is shown. The balancing lugs 32 and balancing rods or pins 72 are related in mating fashion. Balancing lugs 32 (32A, 32B, 32C, 232, 332 and 334, described hereinafter) are suitably substantially arcuate, having a substantially C-shape, with an inside diameter 70. To balance an idler made in accordance with the present invention, one or more rods or pins 72 are inserted into one or more balancing lugs 32. Pins 72 are suitably substantially elongate and cylindrical, and have a diameter which is substantially the same as diameter 70 of lugs 32. By press fitting pin 72 into lug 32, three-dimensioned balancing of idler body 54 is obtained. Pins 72 may be pressed into lugs 32 anywhere along the full length of the idler body 54, thus providing very fine tuning of the balancing of the idler body. It is noted that the balancing feature for tubing 20A, tubing 20B, tubing 20C and tubing 200 described hereinbelow operates exactly the same as described for tubing 20 herein. It is also especially noted that balancing lug feature of an idler constructed in accordance with the present invention as described hereinabove permits the idler to be completely set up with the bearings in place, and then balanced.

Figure 9:
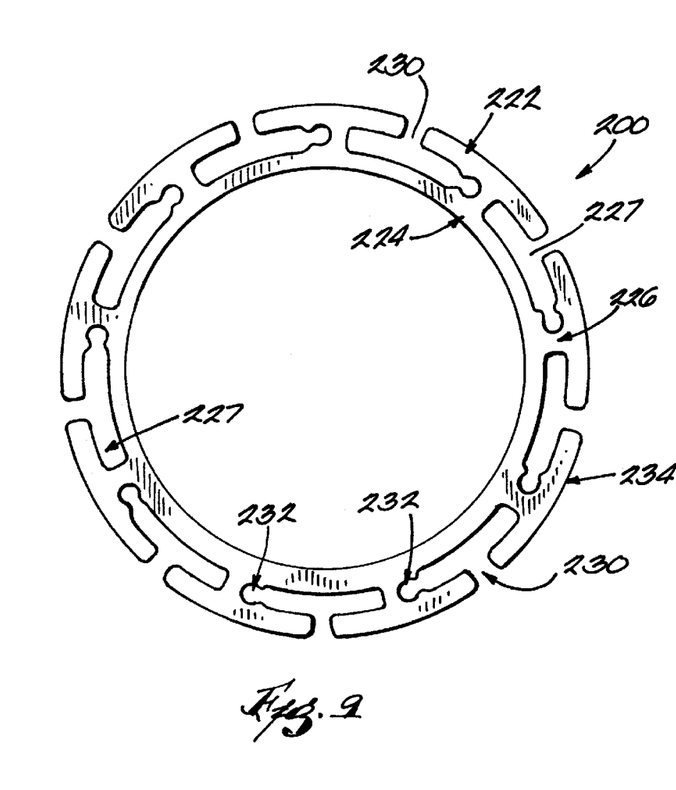
FIG. 9 is a cross-sectional view of another embodiment of the idler tubing in accordance with the present invention.

Reference is now made to FIG. 9, wherein the outer wall of the tubing in accordance with the present invention is shown in an alternative embodiment with the configuration of the balancing lugs shown in FIG. 3. In the illustrated embodiment, tubing 200 has an outer tube 222, an inner tube 224 and spokes 226. Spokes 226 together with outer tube 222 and inner tube 224 define a plurality of spaces 227. The outer tube of the tubing is interrupted with a series of recesses 230 which run the length of tubing 200. These recesses are integral with spaces 227 which, in turn, have integral lugs 232. In other words, outer tube 222 is configured as a continuous series of arcs 234 around the circumference of tubing 200. In the illustrated embodiment, nine arcs 234 are shown; however, the number may vary suitably from three to twenty-five. Tubing 200 permits a built-in air exhausting mechanism for elevating air entrainment in the web. Trapped air enters the recesses and is conducted to the sides of the tubing and thereby dissipated. Tubing 200 has the same advantageous features as tubing 20 described hereinabove except for the alternative outer tube embodiment.

Figure 10:
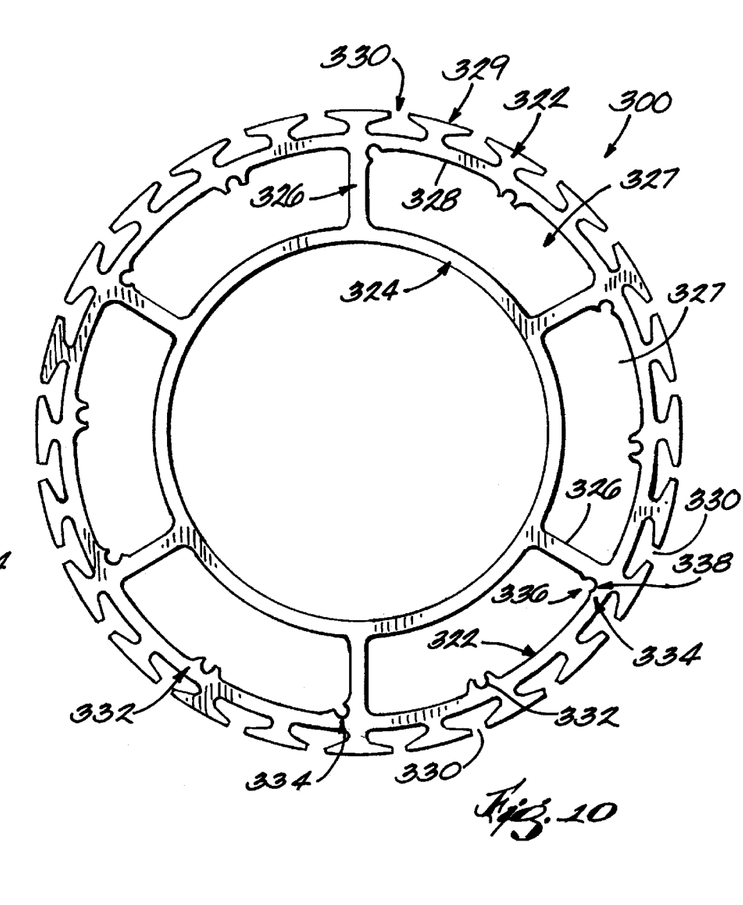
FIG. 10 is a cross-sectional view of a third embodiment of the idler tubing, illustrating a fifth configuration of the balancing lugs.

Reference is now made to FIG. 10 wherein a third embodiment of the outer tubing of the tubing in accordance with the present invention is shown with a fifth configuration for the balancing lugs. Shown is tubing 300 having an outer tube 322, an inner tube 324 and spokes 326. Outer tubing 322 has an inner surface 328 and an outer surface 329. Spokes 326 together with inner surface 328 of outer tube 322 and inner tube 324 define a plurality of spaces 327. Outer surface 329 of outer tube 322 is interrupted with a series of recesses 330 which run the length of tubing 300. Recesses 330 permit elevating air entrainment in the web in the same manner explained for the recesses in the embodiment of FIG. 9. Tubing 300 includes balancing lugs 332 and 334. Both balancing lugs are arcuate in configuration. Balancing lugs 332 are arcuate projections extending from inner surface 328 of outer tube 322. Balancing lugs 334 are shaped as integral recesses 336 with outer tube 322 and spokes 326 at the intersection 338 of outer tube 322 and spokes 326. Tubing 300 has the same advantages as tubing 20 and the balancing rods operate in the same manner as with tubing 20.

In summary, the present invention provides an idler tubing material for constructing idlers. The tubing eliminates any need for end plugs and permits the bearing bores to be recessed into the tubing. The idler constructed from the tubing material in accordance with the present invention is stronger, lighter, of lower cost and of greater ease of manufacture than one constructed from conventional single-walled tubing.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

What is claimed is:

1. A member suitable for an idler, comprising:
   a one-piece unitarily formed tube, wherein said tube comprises, an outer elongate tube having a first outside surface and a first inside surface;
   an inner elongate tube having a second outside surface and a second inside surface, wherein said inner elongate tube is concentrically disposed within said outer elongate tube;
   a plurality of radially disposed and spaced apart spokes rigidly interconnecting said inner elongate tube to said outer elongate tube; and
   a plurality of spaced apart balancing lusgs having holding members for receiving balancing pins, wherein said lugs are radially disposed about said member between said outer elongate tube and said inner elongate tube; and wherein no balancing lugs are diposed on said second inside surface of said inner elongate tube.

2. The member of claim 1, wherein said spokes connect said second outer surface of said inner elongate tube to said first inside surface of said outer elongate tube.

3. The member of claim 1, wherein said plurality of lugs project from said first inside surface of said outer elongate tube.

4. The member of claim 1, wherein said member is constructed of a material which is extruded aluminum, carbon fiber or plastic.

5. The member of claim 1, wherein said outside surface of said outer tube has a series of recesses.

6. The member of claim 5, further comprising a plurality of recesses defining a plurality of first balancing lugs each at an intersection of said outer tube and a spoke.

7. The member of claim 6, further comprising a plurality of second balancing lugs projecting from said inside surface of said outer tube.

8. The member of claim 1, wherein said inside surface of said outer tube has a plurality of radially disposed and spaced apart recesses defining said plurality of balancing lugs.

9. The member of claim 1, wherein said plurality of spokes each has a sidewall having a recess defining a balancing lug.

10. The member of claim 9, wherein said plurality of balancing lugs each has an arcuate shape and said balancing pins are cylindrical.

11. The tubing member of claim 1, wherein said plurality of spokes each has a sidewall and a balancing lug projects from said sidewall.

12. A method of constructing an idler, comprising the steps of:
    providing a length of tubing having opposed ends, are including an outer elongate tube, an inner elongate tube having an inner surface and concentrically disposed within said outer tube, a plurality of spokes rigidly interconnecting said inner tube to said outer tube, and spaced apart balancing lugs radially disposed about the tubing between said outer tube and said inner tube, providing balancing pins dimensioned and configured to be held by said balancing lugs, said balancing lugs and said balancing pins being adapted to be used to balance said idler;
    inserting a bearing assembly into said inner surface of said inner tube at a distance apart from an end of said tubing, said inner surface closely receiving said bearing assembly; and
    press-fitting a support into said bearing assembly.

13. An idler comprising:
    a substantially cylindrical idler body having opposed ends, said idler body including an outer elongate tube; an inner elongate tube having an inner surface and concentrically disposed within said outer tube, a plurality of radially disposed spokes rigidly interconnecting said inner tube to said outer tube, and spaced apart balancing lugs radially disposed about said idler body, between said outer tube and said inner tube;

balancing pins dimensioned and configured to be held by said balancing lugs; and a pair of bearings, each spaced apart and press fit into said inner surface of said inner tube, at a distance apart form the ends of said idler body.

14. A kit for constructing an idler, comprising:

a tubing having opposed ends, and including an outer elongate tube, a cylindrical inner elongate tube having an inner surface and concentrically disposed within said outer tube, a plurality of spokes rigidly interconnecting said inner tube to said outer tube, and spaced apart balancing lugs radially disposed about said tubing between said outer tube and said inner tube;

balancing pins dimensioned and configured to be matingly held by said lugs, such that said balancing pins and said balancing lugs are adapted to be used to balance said idler.

15. A method of reducing tube deflection in an idler for supporting a web, comprising:

providing a tubing having opposite ends, and including an outer elongate tube; an inner elongate tube having an inner surface and concentrically disposed within said outer tube, a plurality of spokes rigidly interconnecting said inner tube to said outer tube, and spaced apart balancing lugs radially disppposed about said tubing between said outer tube and said inner tube;

press-fitting a pair of bearings each into opposite ends of said tubing and into said inner surface of said inner tube at a distance apart form the end of said tubing and at a distance from each other to provide an idler width W;

wherein said tubing supports a web load L and the deflection of said tubing is reduced in proportion to the cube of the idler width W.

16. The method of claim 15, wherein the deflection is calculated in accordance with the following relationship:

$$D = \frac{5LW^3}{384EI}$$

wherein D is the tube deflection, L is the load of the web, W is the idler width, E is the moment of the elasticity of the material of said tubing and I is the moment of the inertia of said tubing.

17. A tubing material suitable for an idler, comprising:

an outer elongate having an outside surface and an inside surface; an inner elongate tube concentrically disposed within said outer tube; a plurality of radially disposed and spaced apart spokes rigidly interconnecting said inner tube to said outer tube; a plurality of spaced apart balancing lugs radially disposed about the material between said outer tube and said inner tube; and balancing pins matingly configured to be received by said balancing lugs, such that said balancing pins and said balancing lugs are adapted to be used to balance said idler.

18. A method of constructing an idler, comprising the steps of:

providing a length of tubing having opposed ends, and including an outer elongate tube, an inner elongate tube having an inner surface and concentrically disposed within said outer tube, a plurality of spokes rigidly interconnecting said inner tube to said outer tube, and spaced apart balancing lugs radially disposed about the tubing between said outer tube and said inner tube, for holding balancing pins;

inserting one or more balancing pins into one or more of said plurality of lugs to balance the idler;

inserting a bearing assembly into said inner surface of said inner tube at a distance apart from an end of said tubing, said inner surface closely receiving said bearing assembly; and press-fitting a support shaft into said bearing assembly.

19. An idler, comprising:

a substantially cylindrical idler body having opposed ends, said idler body including an outer elongate tube; an inner elongate tube having an inner surface and concentrically disposed within said outer tube; a plurality of radially disposed spokes rigidly interconnecting said inner tube to said outer tube; spaced apart balancing lugs radially disposed about said idler body between said outer tube and said inner tube; a pair of bearings, each spaced apart and press fit into said inner surface of said inner tube, at a distance apart from the ends of saaid idler body; and one or more balancing pins matingly held by one or more of said plurality of lugs.

20. A method of reducing tube deflection in an idler for supporting a web, comprising:

providing a tubing having opposite ends, and including an outer elongate tube; an inner elongate tube having an inner surface and concentrically disposed within said outer tube, a plurality of spokes rigidly interconnecting said inner tube to said outer tube, and spaced apart balancing lugs radially disposed about said tubing between said outer tub and said inner tube;

inserting one or more balancing pins into one or more of said plurality of lugs to balance the idler;

press fitting a pair of bearings each into oppposite ends of said tubing and into said inner surface of said inner tube at a distance apart from the end of said tubing and at a distacne from each other to provide an idler witdth W; and wherein said tubing supports a web load L and the deflection of said tubing is reduced in proportion to cube of the idler width W.

21. A kit for constructing an idler, comprising:

a tubing having opposed ends, and including an outer elongate tube, an inner elongate tube having an inner surface and concentrically disposed within said outer tube, a plurality of spokes rigidly interconnecting said inner tube to said outer tube, and spaced apart balancing lugs radially disposed about said tubing between said outer tube and said inner tube;

balancing pins dimensioned and configured to be matingly held by said lugs; and a pair of bearing assemblies each dimensioned for press fitting into said inner surface of said inner tube at a distance apart from an end of said tubing.

22. The kit of claim 21, further comrpising;

a support shaft, eachof said bearing assembly configured and dimensioned to be press-fit onto said shaft.

* * * * *